(12) United States Patent
Danieau et al.

(10) Patent No.: US 6,254,475 B1
(45) Date of Patent: *Jul. 3, 2001

(54) MULTI-VANE REGISTER, ESPECIALLY FOR A MOTOR VEHICLE AIR CONDITIONING SYSTEM

(75) Inventors: Jacques Danieau, Noisy le Roi; Jihad El Mayas, Elancourt, both of (FR)

(73) Assignee: Valeo Climatisation, La Verriere (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/014,825

(22) Filed: Jan. 28, 1998

(30) Foreign Application Priority Data

Jan. 29, 1997 (FR) .................................. 97 00953

(51) Int. Cl.$^7$ ...................................... B60H 1/32
(52) U.S. Cl. ...................... 454/156; 137/601; 454/336
(58) Field of Search .................... 454/121, 154, 454/159, 160, 326, 336; 137/601

(56) References Cited

U.S. PATENT DOCUMENTS

| 1,872,599 | * | 8/1932 | Grand | ................................ 137/601 X |
| 3,547,152 | * | 12/1970 | Hess | ................................. 454/336 X |
| 3,771,559 | * | 11/1973 | Alley | ................................ 454/336 X |
| 3,967,779 | * | 7/1976 | Logsdon | ........................... 137/601 X |
| 4,610,197 | | 9/1986 | Van Becelaere | . |
| 5,454,757 | * | 10/1995 | Wirfel | .................................. 454/336 |

FOREIGN PATENT DOCUMENTS

| 24 31 065 | | 1/1976 | (DE) . | |
| 36 02 120 | | 8/1987 | (DE) . | |
| 1 296 921 | | 11/1972 | (GB) . | |
| 55-121344 | * | 9/1980 | (JP) | ..................................... 137/601 |
| 1-189455 | * | 7/1989 | (JP) | ..................................... 454/336 |
| 4-116337 | * | 4/1992 | (JP) | ..................................... 454/326 |
| 96/16827 | | 6/1996 | (WO) . | |

* cited by examiner

*Primary Examiner*—Harold Joyce
(74) *Attorney, Agent, or Firm*—Morgan & Finnegan, LLP

(57) ABSTRACT

An air flow control register includes a frame carrying pivotable vanes, which are rotated on parallel axes by a common drive mechanism, so that the setting of the vanes is variable between a maximum flow position, in which the flaps have a minimum inclination with respect to the direction of air flow through the register, and a no-flow position in which this inclination is a maximum. The drive mechanism controls the pivoting of the vanes in such a way that they all rotate by the same amount, with alternate vanes rotating in opposite directions.

9 Claims, 3 Drawing Sheets

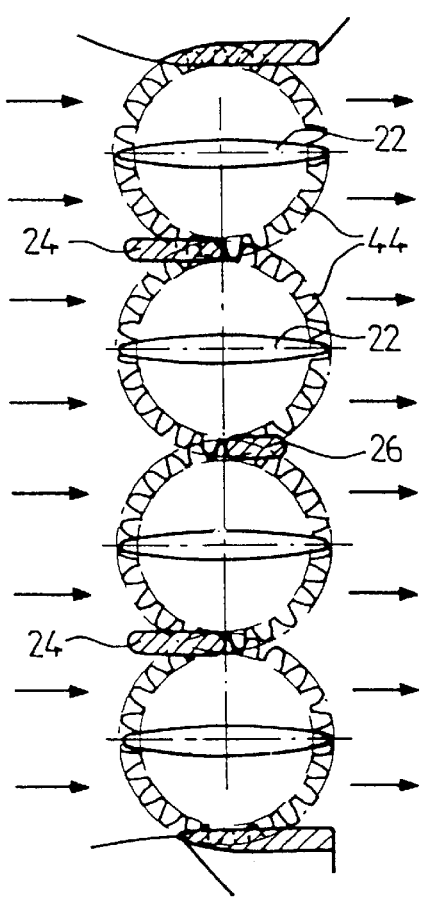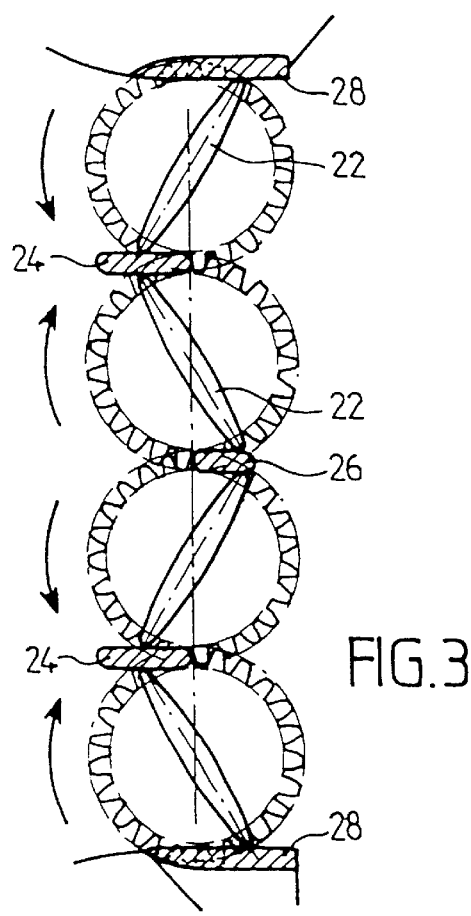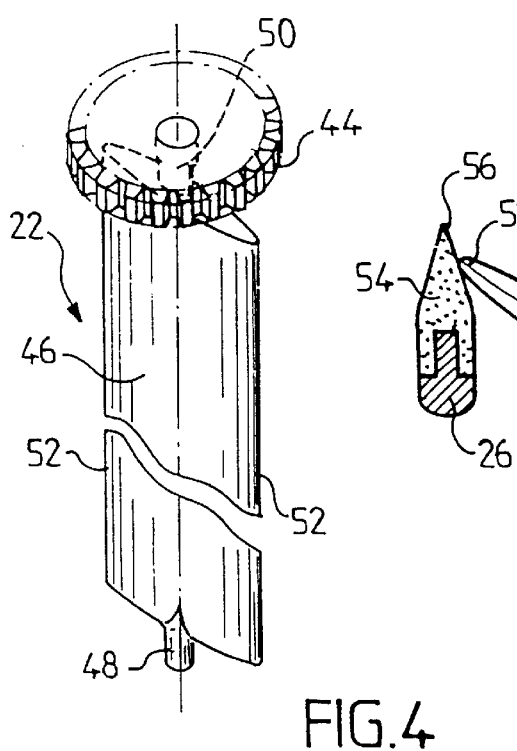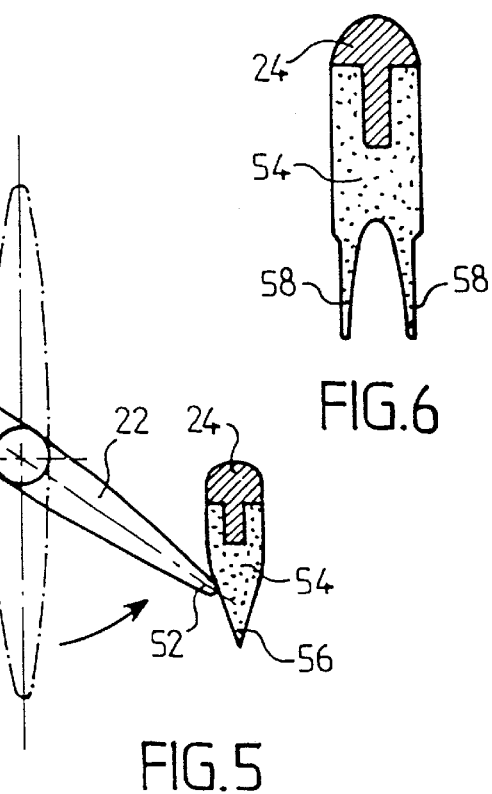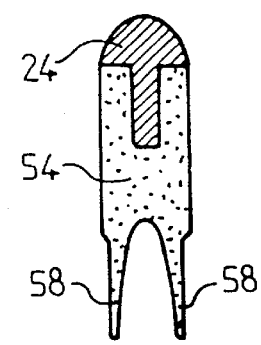

MULTI-VANE REGISTER, ESPECIALLY FOR A MOTOR VEHICLE AIR CONDITIONING SYSTEM

FIELD OF THE INVENTION

This invention relates to the control of air flows, and more particularly, but without limitation, to the field of air conditioning installations for motor vehicles.

More precisely, the invention relates to multi-vane registers whereby the flow rate of a stream of air can be varied as a function of the position of the vanes of the register.

BACKGROUND OF THE INVENTION

It is known to provide such registers having a plurality of vanes (blades, slats, flaps) which are synchronised under a common control, in the manner described for example in international patent specification No. WO96116827. These pivoting vanes are usually articulated about their central axis of symmetry, and are therefore driven simultaneously, all in the same direction, by a suitable drive mechanism such as a crank.

The use of a register of this kind makes it necessary to introduce a lateral component into the air flow, which is thereby offset upwardly or downwardly with respect to the structure which carries the vanes. With this arrangement it is only when the register is fully open that the air flow is properly homogeneous. Thus, in all intermediate positions between the fully closed and fully open positions of the register, there is a tendency towards poor mixing of the air, for example at the surface of a heat exchanger or in a mixing chamber, both of which are situated downstream of the multi-vane register.

SUMMARY OF THE INVENTION

One aspect of the preferred embodiment includes a register structure having multiple vanes which overcomes the above drawbacks, by giving, for all intermediate positions of the register, a downstream air flow which has substantially no lateral component, and which is therefore much more efficient as regards the design of the air conditioning system.

A register according to the preferred embodiment is a multi-vane register comprising a frame which carries a plurality of pivoting vanes mounted for rotation about mutually parallel axes, this rotation being controlled by any suitable common drive mechanism in such a way as to cause the positions of the vanes to be varied, between a position of maximum air flow in which the vanes have a minimum inclination with respect to the direction of the stream of air passing through the register, and a no-flow position, or minimum position, in which the vanes have a maximum inclination with respect to the direction.

According to the preferred embodiment, in such a register, the drive mechanism controls pivoting of the vanes of the register in such a way that all the vanes pivot through the same angle, but with each vane pivoting in the opposite direction of rotation from the next.

An even number of vanes is preferred.

In a first embodiment of the invention, the frame carries a plurality of elongate intermediate baffles or spacers, which extend lengthwise parallel to the axis of the vanes, the width of each baffle extending in the direction of the stream of air, the thickness and position of the intermediate baffles being so chosen that the free edges of the vanes, in the no-flow position, come into contact with the wall of the adjacent intermediate baffle. In that case, preferably, the intermediate baffles carry, in the region of contact with the adjacent vane, a deformable sealing and engagement element, which is preferably a sealing element moulded on the intermediate baffle.

In another embodiment of the invention, the respective free edges of adjacent vanes are arranged to make contact with each other in the no-flow position. In that case, preferably, the free edges of each vane carries a deformable sealing and engagement element in the region of contact with the adjacent vane. Preferably, such a sealing element is formed by moulding it on the body of the vane. The sealing element preferably has a rounded, bead-shaped, thickened portion at its free edge.

According to a preferred feature of the invention, the entry side, or the exit side, or both, of each vane is provided with roughening means such as to reduce aerodynamic noise and adapted to modify the flow of the stream of air locally by causing attachment of the boundary layer.

Further features and advantages of the invention will appear more clearly on a reading of the following description of some preferred embodiments of the invention, given by way of non-limiting example only and with reference to the accompanying drawings.

BRIEF DESCRIPTION OF THE DRAWINGS

FIG. 2 shows the positions of the vanes of the register in their fully open position.

FIG. 3 shows the positions of the vanes of the register in their closed position.

FIG. 4 is a perspective view of an individual vane.

FIG. 5 shows how sealing of the vanes of the register is obtained when the vanes are closed.

FIG. 6 shows an alternative version of a seal, having twin lips, that can be used with the structure shown in FIG. 5.

DESCRIPTION OF PREFERRED EMBODIMENTS

Figure 1:
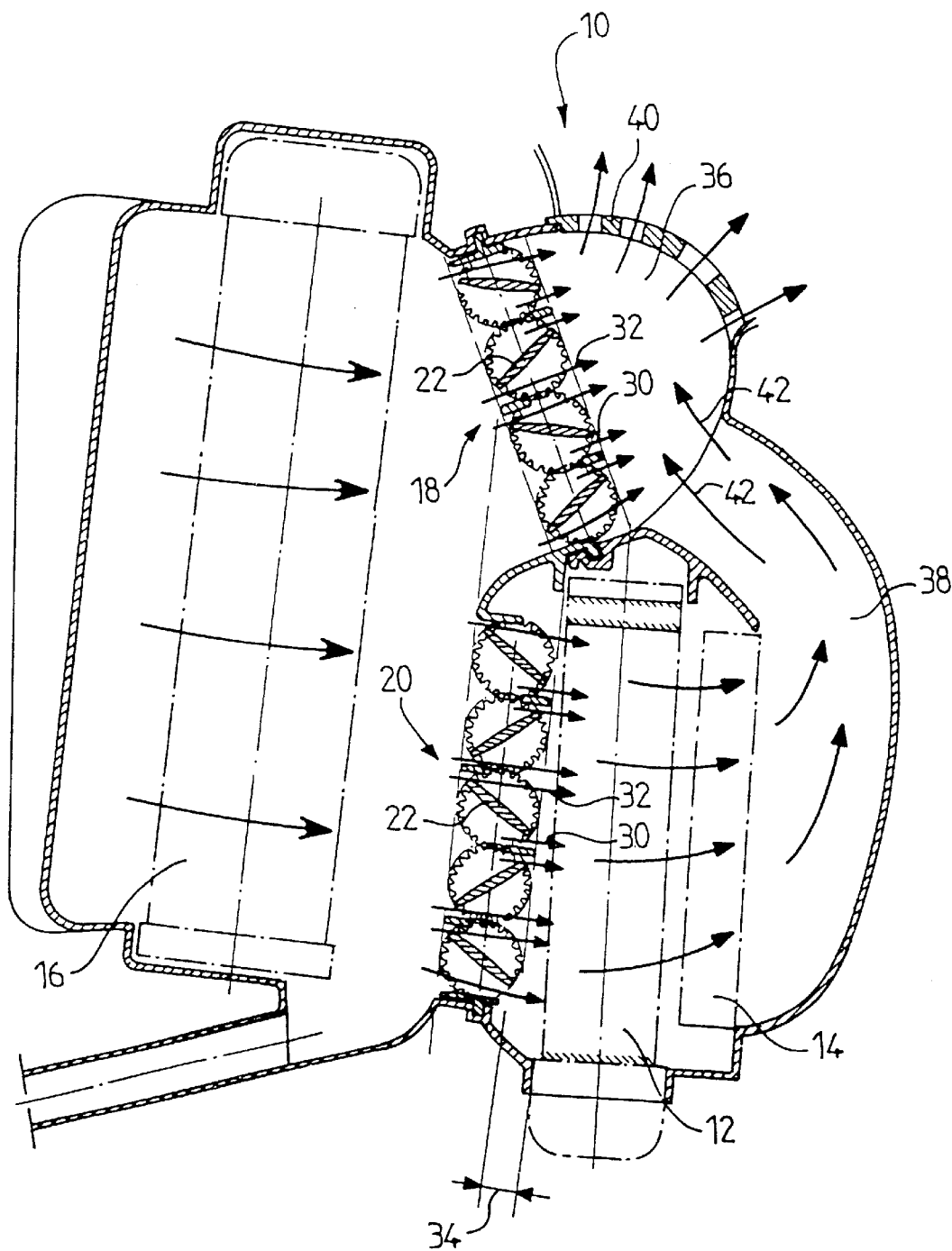
FIG. 1 is a view in cross section showing various elements of a motor vehicle air conditioning system.

FIG. 1 shows an air conditioning system for a motor vehicle, comprising a radiator 12, an optional heating resistance 14, an evaporator 16 of an optional air cooling apparatus, and two sets of multi-vane registers 18 and 20. The resistance 14 may in particular be a positive temperature coefficient resistance. The registers are arranged to deliver the air streams, received from the left in FIG. 1 as indicated by straight arrows, to a low zone (for hot air) and a high zone (for cold or cooled air).

The two registers 18 and 20 have similar structures, each including a plurality of articulated vanes 22 which are arranged to pivot about their respective longitudinal central axes. As can be seen in greater detail in FIGS. 2 and 3, rotation of the vanes is, according to a feature of the present invention, symmetrical from one vane to the next, that is to say, for a vane which rotates in the clockwise direction with reference to the Figures, the adjacent vane or vanes will turn in the opposite direction.

The various vanes are mounted on a frame which is provided with intermediate baffles or spacers 24, 26, which have a stiffening function so as to render the whole structure rigid. These baffles also provide sealing of the register when the latter is closed. In this connection, in the closed position shown in FIG. 3, the free edges of each vane 22 are abutted against the corresponding baffles 24 or 26, or against the edge of the frame 28 in the case of the endmost vanes. How these contacts are sealed will be explained later herein with reference to FIGS. 5 and 6.

The advantage of this configuration lies in the fact that the stream of air delivered from the register no longer has a lateral component, as is shown by the arrows 30 and 32 in FIG. 1, and this is so regardless of the setting of the vanes of the register. In the lower part, the absence of any lateral component dependent on the position of the vanes of the register in particular enables the distance between the lower register 20 and the radiator 12 to be reduced, because the latter will be ventilated by a stream of air which has a particularly high degree of homogeneity and which flows at right angles to the largest dimension of the radiator. This bringing closer together of the lower register 20 and the radiator 12 makes the air conditioning system more compact on the downstream side (i.e. on the right in FIG. 1), in spite of the presence of any heating resistance 14.

As regards the high zone register 18, the stream of cold air coming from the evaporator 16 (or simply the stream of fresh air drawn from outside), passes through the upper register 18 at right angles to its largest dimension, into a mixing chamber 36 in which the cold air stream is combined with the stream of hot air which is delivered from the radiator 12 via a duct 38. This mixture of air is diffused into the cabin of the vehicle through a turbulating grid 40.

The particular structure of each register enables the appropriate stream of cold or hot air to meet in directions which are substantially perpendicular to each other, as indicated by the arrows 30 and 32 on the one hand and 42 on the other hand in FIG. 1. Mixing is thus optimised and is regular in character, independently of the particular position of the vanes of the upper register 18, which does not perturb the direction of flow of the cold air stream.

Reference is now made to FIG. 4, which shows the structure of one vane, which may be made in the form of a single moulded piece, either of metal or of plastics material. It includes a toothed drive wheel or pinion 44 for rotating the vane body 46 in pivoting motion about a trunnion or axis pin 48. The pinion 44 is joined to the vane body 46 through a rigid axial spacer portion 50. Meshing of the pinions 44 with each other gives simple driving of alternate vanes in opposite directions. One of the pinions of the register is driven, in the usual way, by a drive system consisting of a crank, a cam, a micromotor, or any other suitable device, so as to adjust the positions of the vanes of the register for the required air conditioning temperature.

Referring now to FIG. 5, this shows, for one embodiment of the invention, how sealing is obtained in the closed position of the register. In this closed configuration, each of the longitudinal free edges 52 of the vane 22 comes into contact with the corresponding spacer 24 or 26. In order to give satisfactory sealing, this spacer is provided with a flexible sealing element 54 that also acts as an engagement element. The sealing element 54 has a tapered portion 56 against which the corresponding free edge 52 of the vane engages (with the similar free edge of the adjacent vane also engaging against it).

In the modified version shown in FIG. 6, the sealing element 54 may be moulded in position. This version of the sealing element has two distinct lips 58, each of which is arranged to make contact with the free edge of a respective one of the two adjacent vanes.

Figure 7:
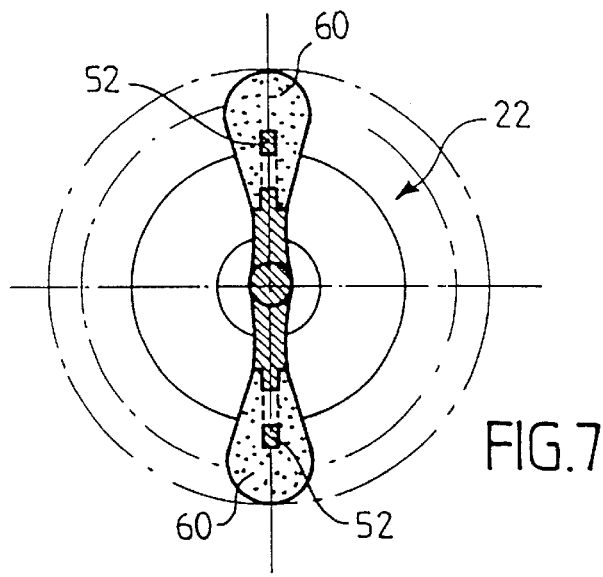
FIG. 7 shows a further embodiment of the register in accordance with the invention.
Figure 8:
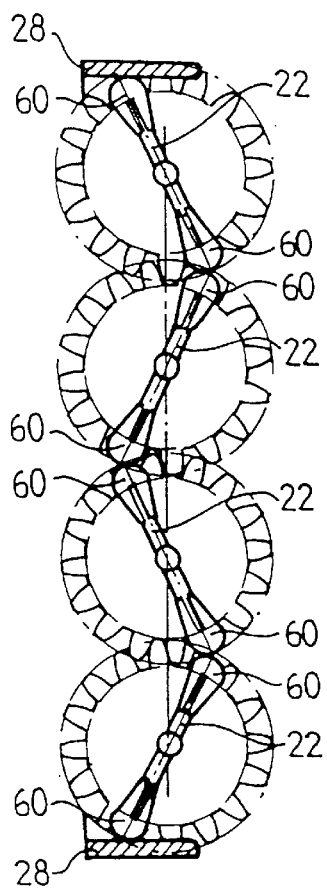
FIG. 8 is a view corresponding to FIG. 3 but relating to the second embodiment shown in FIG. 7.

Reference is now made to FIGS. 7 and 8, showing another version of the register of the invention, in which the register does not have the baffles or spacers 24, 26. This absence of baffles enables the flow cross section for air through the register to be increased, and consequently enables the mechanical resistance to the air flow, offered by the register when the latter is fully or partly open, to be correspondingly reduced.

In order to be able to give sealed closure of the register, the free edges 52 of each vane 22 are in this case provided with a sealing element 60, which may for example be moulded in position. Obturation, i.e. blockage of the air flow, is obtained by two opposed sealing elements 60 coming into contact with each other as can be seen in FIG. 8, which shows the register in its fully closed position. It will be noted that in this position, the outermost free edges of the endmost vanes make contact with the sides 28 of the frame of the register.

The applied, moulding sealing element 60 preferably has, as is shown in the drawings, a very much rounded form at its distal end, similar to a bead or a raindrop in cross section. This attenuates the aerodynamic whistling noises which are due to changes in cross section resulting from adjustment of the air stream.

In apparatus according to the invention, for example in either one of the embodiments of the latter described above, noise reduction means may be disposed on the vanes, this noise reduction means being linked with the separation of the air boundary layer on the bodies of the vanes. In this connection, from the aerodynamic point of view the body of each vane is like an inclined surface having a variable angle with respect to the direction of the stream of air, this variation in angle causing a variation in the air flow rate, typically from 0 to 300 kg/h.

It is found that, where the inclination is of the order of about 50°, a howling noise is produced. This phenomenon is connected with the separation of the boundary layer on the exit side of the inclined vane body. On either side of the separated boundary layer, a difference in pressure is set up which produces this howling noise.

In order to overcome this problem, the exit side 62 or the entry side 64, or each of them, is provided (on the surface of the vane body) with an obstacle, the purpose of which is to provide enhanced attachment of the boundary layer on the surface of the vane body, thus reducing the aerodynamic noise produced. These obstacles can take many different forms, some of which are shown in FIGS. 9 to 13.

Figure 9:
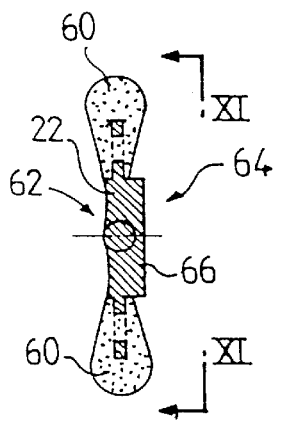
FIG. 9 is a view in cross section showing a register vane in one form according to the invention, having means for attenuating aerodynamic noise.
Figure 11:
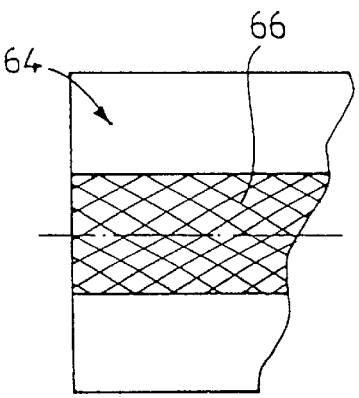
FIG. 11 is a plan view of part of the vane shown in FIG. 9, seen in the direction of the arrows XI—XI in FIG. 9.

In a first embodiment of this arrangement, shown in FIGS. 9 and 11, a grid pattern 66 is formed in relief, for example by integral moulding, on one or both of the two faces 62, 64 of the vane body, with the grid extending over all or part of the central portion of the vane body, i.e. the portion situated between the two sealing elements 60.

Figure 10:
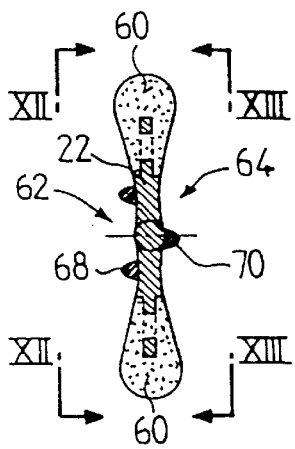
FIG. 10 is a view in cross section showing such a vane in another form, the vane again having means for attenuating aerodynamic noise.
Figure 12:
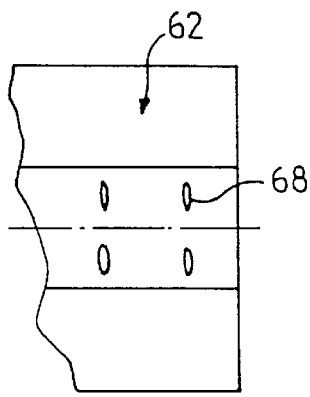
FIGS. 12 and 13 are plan views, each showing a portion of the vane seen in FIG. 10, viewed in the directions XII—XII and XIII—XIII respectively.
Figure 13:
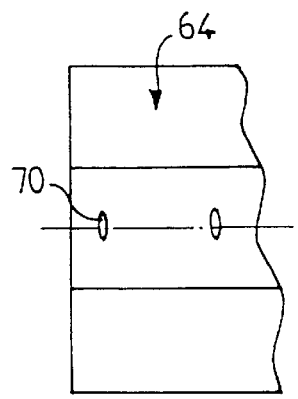

In the further embodiment shown in FIGS. 10, 12 and 13, the obstacles are in the form of discrete reliefs 68 or 70.

These can be disposed in one or more lines, or in some more complex configuration, or indeed in a random arrangement, again on either one or both of the faces 62, 64 of the vane body.

What is claimed is:

1. A register comprising:

two sets of a plurality of pivotable vanes;

a common frame carrying the two sets of vanes;

each set of vanes comprising a common drive device coupled to the vanes for varying the setting of the vanes and defining a direction of flow through the register, each common drive device being arranged to vary the setting of the vanes of each set between a maximum flow and no-flow position such that the plurality of the vanes pivot through a same angle of rotation, with each vane rotating in the opposite direction form an adjacent vane, the two common drive devices being coordinated such that, when a set of vanes varies from a maximum flow to a no-flow position, the other set of vanes varies from a no-flow to a maximum flow position, wherein the frame further includes a plurality of intermediate baffles each having a length and a width, the length of each of the baffles being parallel to axes of rotation, the width of each of the baffles extending in the flow direction, each of the vanes having opposing free edges, and each of the baffles having a thickness and a position such that in the no-flow position, the free edges of the vanes make contact with an adjacent baffle.

2. A register according to claim 1 having an even number of vanes.

3. A register according to claim 1, wherein each of the baffles further includes a sealing and engagement element.

4. A register according to claim 3, wherein the sealing and engagement element is moulded on the intermediate baffle.

5. A register according to claim 1, wherein each of the vanes has opposing free edges, the vanes being so disposed in relation to each other such that in the no-flow position the free edges of adjacent vanes make contact with each other.

6. An apparatus comprising:

a frame;

two sets of a plurality of vanes located within the frame and arranged to pivot about an axis;

a plurality of drive wheels for rotating each of the vanes around the axis, the drive wheels of the vanes of a set not meshing with drive wheel of the vanes of the other set; and intermediate baffles, each of the intermediate baffles having a sealing and engagement element, wherein the sealing and engagement element comprises a tapered portion which makes contact with the free edges of the vanes when the apparatus is in a closed position.

7. An air conditioning system for a motor vehicle comprising the apparatus of claim 6.

8. An apparatus comprising:

a frame;

two sets of a plurality of vanes located within the frame and arranged to pivot about an axis;

a plurality of drive wheels for rotating each of the vanes around the axis, the drive wheels of the vanes of a set not meshing with drive wheel of the vanes of the other set; and intermediate baffles, each of the intermediate baffles having a sealing and engagement element, wherein the sealing and engagement element comprises two distinct lips which make contact with the free edges of the vanes when the apparatus is in a closed position.

9. An air conditioning system for a motor vehicle comprising the apparatus of claim 8.

* * * * *